(12) United States Patent
Stevens et al.

(10) Patent No.: US 7,251,393 B2
(45) Date of Patent: Jul. 31, 2007

(54) OPTICAL ROUTER

(75) Inventors: Rick C. Stevens, Apple Valley, MN (US); Kevin J. Thorson, Eagan, MN (US)

(73) Assignee: Lockheed Martin Corporation, Bethesda, MD (US)

(*) Notice: Subject to any disclaimer, the term of this patent is extended or adjusted under 35 U.S.C. 154(b) by 239 days.

(21) Appl. No.: 10/812,798

(22) Filed: Mar. 30, 2004

(65) Prior Publication Data

US 2005/0220413 A1    Oct. 6, 2005

(51) Int. Cl.
*G02B 6/26* (2006.01)
(52) U.S. Cl. .................. 385/31; 385/32; 385/36; 385/39; 385/131
(58) Field of Classification Search .................. 385/31, 385/32, 36, 39, 131
See application file for complete search history.

(56) References Cited

U.S. PATENT DOCUMENTS

| | | | | |
|---|---|---|---|---|
| 5,039,192 A * | 8/1991 | Basu | ...................... | 385/31 |
| 5,195,150 A * | 3/1993 | Stegmueller et al. | .......... | 385/33 |
| 5,198,008 A * | 3/1993 | Thomas | ...................... | 385/130 |
| 5,600,741 A * | 2/1997 | Hauer et al. | ................. | 385/35 |
| 6,324,313 B1 * | 11/2001 | Allman et al. | ................. | 385/14 |
| 6,450,699 B1 * | 9/2002 | Murali et al. | ................. | 385/88 |
| 6,491,447 B2 * | 12/2002 | Aihara | ........................ | 385/92 |
| 6,804,423 B2 * | 10/2004 | Tsukamoto et al. | ........... | 385/14 |
| 6,810,160 B2 * | 10/2004 | Sugama et al. | ................ | 385/14 |
| 6,839,476 B2 * | 1/2005 | Kim et al. | ..................... | 385/14 |
| 6,856,721 B2 * | 2/2005 | Perner | ........................ | 385/24 |
| 2002/0051599 A1 * | 5/2002 | Tsukamoto et al. | | |
| 2002/0109074 A1 * | 8/2002 | Uchida | .................... | 250/214.1 |
| 2003/0152354 A1 * | 8/2003 | Uchida | ....................... | 385/129 |
| 2003/0161573 A1 * | 8/2003 | Ishida et al. | .................. | 385/14 |
| 2003/0179979 A1 * | 9/2003 | Ouchi | ......................... | 385/14 |
| 2004/0042705 A1 * | 3/2004 | Uchida et al. | ................ | 385/14 |
| 2004/0091211 A1 * | 5/2004 | Umebayshi et al. | .......... | 385/49 |
| 2004/0101259 A1 * | 5/2004 | Kilian | ......................... | 385/93 |

* cited by examiner

*Primary Examiner*—Frank G. Font
*Assistant Examiner*—James P. Hughes
(74) *Attorney, Agent, or Firm*—Jacobson & Johnson

(57) ABSTRACT

Optical routers or optical interconnection devices that include an optical coupling method and optical coupling apparatus wherein a plurality of layers that contain optical devices that require optical coupling can be optically coupled by inserting optical coupling elements therein to transfer a light signal from one location on one layer to another location on a different layer. The optical coupling elements can include various light directing members such as reflectors, beam splitters/combiners or other components that can act on a light signal to modify, or control the light signal in a desired manner. In addition, an optical coupling elements can be transparent to the light signal so as not affect the direction or the integrity of the light signal as it passes through the optical coupling element.

28 Claims, 3 Drawing Sheets

OPTICAL ROUTER

FIELD OF THE INVENTION

This invention relates generally to optical routers or optical interconnection devices, and more specifically, to optical coupling elements that can direct optical signals within of a circuit board.

Cross-reference to Related Applications

None

Statement Regarding Federally Sponsored Research

None

Reference to a "Microfiche Appendix"

None.

BACKGROUND OF THE INVENTION

This invention relates to multi-layered devices that can be used for optical printed circuit boards (PCBs), optical backplanes, passive optical networks or other optical devices that require optical array interconnections. More particularly, this invention relates to optical interconnection devices that allow light signals to be transferred from one layer to another layer through one or more stackable optical coupling elements.

Optical transmission paths are general formed of light conducting members that are arranged to intersect each other. These light conducting members, which can consist of optical fibers or optical waveguides, are generally supported on a substrate. Oftentimes the circuit boards and optical devices are stacked to form a multi-layer device. However, such multi-layer devices, although more compact then a set of unstacked single layer devices, fail to achieve the full benefit of stacking because it is difficult to directly route a light signal from one layer to another. In such stacked devices light is generally directed from one layer to another by having the light path on one layer extend to an external peripheral extension member where it is then sent to a second layer through another peripheral extension member on a second layer.

In contrast to the prior art method, of using external peripheral extension members to transfer the optical signals from one layer to another, the present invention can directly transfer a light signal from one layer of a multi-layer device to one or more layers of the multi-layer device without the need for external peripheral extension members on each of the layers of the multi-layer device. Thus, the optical interface of the present invention can be used to connect active optical devices, passive optical devices and optical waveguides without the need for external peripheral extension members to transfer the optical signals from one layer to another.

BRIEF SUMMARY OF THE INVENTION

The present invention comprises an optical router that includes an optical coupling method and optical coupling apparatus wherein a plurality of layers that contain optical devices, which require optical coupling, can be optically coupled by inserting an optical coupling element or elements therein to transfer a light signal from one location on one layer to another location on a different layer. The optical coupling elements can include various light directing members such as reflectors, beam splitters or other components that can act on a light signal to modify, or control the light signal in a desired manner. In addition, an optical coupling element can be transparent to the light signal (i.e. passive) so as not affect the direction or the integrity of the light signal as it passes through the optical coupling element.

DETAILED DESCRIPTION OF THE INVENTION

The optical coupling elements of the present invention provide a compact, affordable and reliable optical interconnection device that extends network routing capability and enhances design flexibility. One can utilize the invention in optical backplanes, passive optical networks or other multilayer devices having optical connections to allow one to efficiently and compactly interconnect the optical fibers in the different layers of a multi-layered device. Light directing members in the optical coupling elements include such light directing members as light splitters, light combiners and the like which can be fixedly embedded into a optical coupling element. The optical coupling elements can extend from layer to layer or can be stacked. In either case the optical coupling elements provide an optical coupler or optical interconnection device that can effectively transfer a light signal from one layer to another layer of a multi-layer device without having to direct the light signal to a remote peripheral extension.

In general, one forms a multi-layer device from a plurality of layers or substrates that each contain optical fibers or optical waveguides that require some type of optical interconnection therebetween. Holes or passageways are then formed from one layer to another layer. In the present invention, one inserts optical coupling elements into the passageways or vias in the substrate layers to direct the light from one optical fiber in one layer to another optical fiber in another layer. The optical coupling elements allow one to receive light from an optical fiber in one layer and to transmit a light signal or a portion of the light signal to an optical receiver in an adjacent layer without having to divert the light signal to a peripheral extension member.

Figure 1:
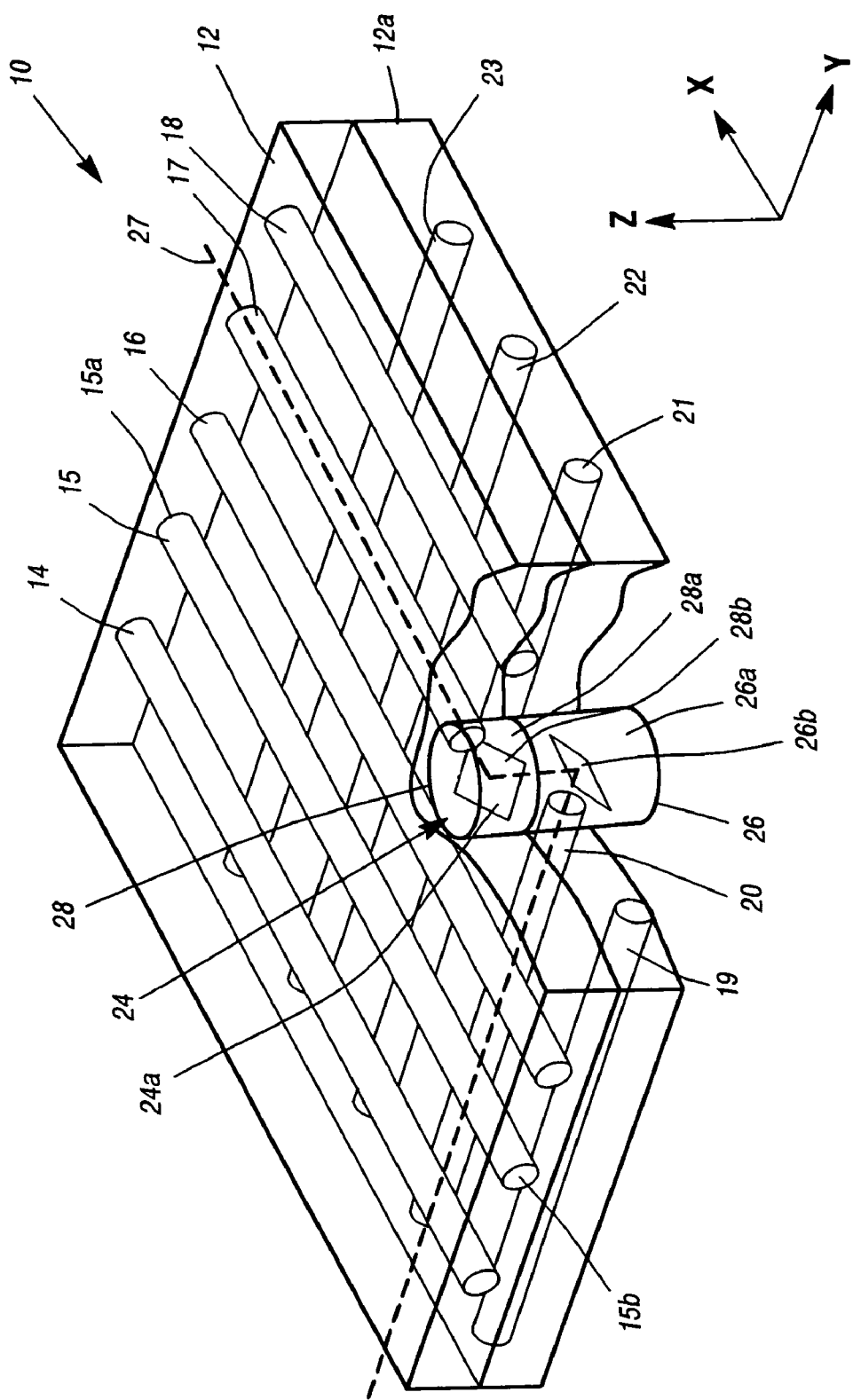
FIG. 1 is a perspective, partially cut-away view of an optical interconnection device constructed in accordance with the invention that connects orthogonally aligned optical fiber layers.

To illustrate the invention reference should be made to FIG. 1. FIG. 1 shows a perspective view of a two layer system 10 in a partial cut-away view. While the two-layer device 10 is shown for purpose of illustration, it is apparent the interconnection principles that are shown in FIG. 1, and described in conjunction therewith, are applicable to optical devices with three or more layers of optical fibers or other devices that require light signal connections between different levels of the optical devices.

The two-layer optical system 10 comprises a first substrate 12 having a first set of parallel oriented optical fibers 14, 15, 16, 17 and 18 extending in a first direction, (which is designated as the "x" direction). For example, optical fiber 15 has one input/output face 15a at one end and a second input/output face 15b at the opposite end. A second substrate 12a, which is layer proximate to substrate 12 also includes a set of parallel oriented optical fibers 19, 20, 21, 22, and 23 that extend in a second direction, (which is normal to the first direction and is designated as the "y" direction). The optical fibers 14-23 can be conventional, commercially available optical fibers that are secured on the substrates 12 and 12a, or they can be optical fibers that are embedded into the substrates 12 and 12a or they can be optical waveguides that are embedded unto substrates 12 and 12a. The optical fibers, which are translucent bodies, can also be part of a polymer flexible circuit, in which case it is preferable that the fibers from a plurality of layers terminate in positions of a single multiple fiber optical connector, for example a conventional optical connector such as an MT style optical connector.

FIG. 1, illustrates how a light signal, which is identified by dashed line 27, can be transmitted through optical fiber 17 in substrate 12 to the optical fiber 20 in the substrate 12a, which is an adjacent layer, by the optical coupler or optical interconnection device 24 of the present invention. That is, the optical coupler device 24, which comprises a lower optical coupling element 26 and an upper optical coupling element 28 which are in a stacked arrangement and positioned along the z axis. The optical coupling element 28, which comprises a light transmitting medium, has a cylindrical shape. The entry/exit face 28a intersects the light signal 27 from optical fiber 17 in substrate 12. The entry/exit faces are polished such that a light signal substantially passes through the entry/exit face rather than being reflected therefrom. The optical coupling element 28 includes an embedded light reflecting mirror 28b that directs the light signal 27 downward along the z axis to a second embedded light reflecting mirror 26b in optical coupling element 26, also cylindrical in shape, that in turn directs the light signal 27 through an entry/exit face 26a and into optical fiber 20 where the light signal 27 travels therealong as indicated by the dashed line.

The optical coupler device 24 can be inserted into passageways or vias that are formed at desired locations on a multi-layered board by laser drilling, or other types of channel forming operations. After the passageways or vias are formed one can press the individual optical coupling element into the vias in the substrates. In the embodiments shown, the length of the optical coupler 24 is sufficiently long so as to extend through substrate 12 and substrate 12a. If it is desired to transmit a light signal from the plane of substrate 12 to a lower substrate layer or a higher substrate layer that are separated by intermediate layers the length of the light coupler 24 can be increased or deceased to accommodate the thickness of the layered substrates. In general the thickness of each optical coupling element math the thickness of to corresponding substrate layer it is passing light through.

Figure 2:
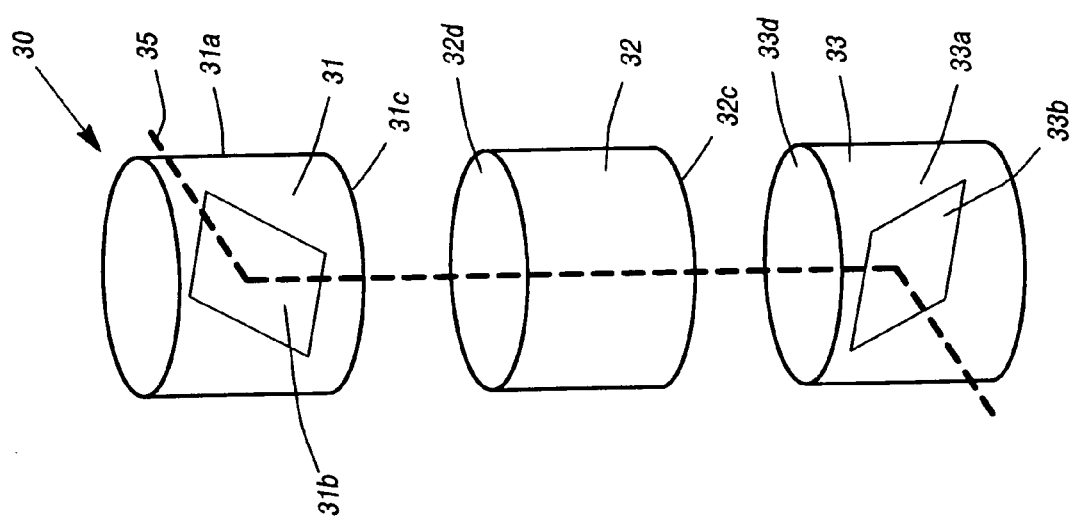
FIG. 2 is an view of three transparent optically coupling elements that are stacked in an end to end relationship.

FIG. 2 shows an exploded view of an optical coupler or optical interconnection device 30 comprising a plurality of three stackable, optical elements 31, 32 and 33. Optical elements 31, 32 and 33 each comprise optical routing elements that route a light signal from one surface of the optical element to another surface of the optical elements.

Each of the optical coupling element has a flat top end surface and a flat bottom end surface to permit stacking in an end-to-end relationship. A dashed line 35 indicates the path a light signal follows as it passes through optical elements 31, 32 and 33.

Optical coupling element 31 has a cylindrical optical entry face 31a and a planer optical exit or end face 31c with the optical exit face 31c also comprising an optical stacking face. By optical stacking face it is understood that another light signal routing element can be stacked proximate the optical stacking face 31c without substantially hindering or degrading the passage of the light signal therethrough. Embedded and fixedly suspended within the optical coupling element 31 is a light directing member, which comprises a mirror 31b that deflects a radially entering light signal 35 from the optical coupling element entry face 31a to the optical coupling element exit face 31c.

Positioned proximate optical coupling element 31 is a passive optical coupling element 32 that has a top exit/entry face 32d and a lower exit/entry face 32c. Exit/entry face 32d is stackable with face 31c so as to permit light signal transfer without substantial degradation. Similarly, the exit/entry face 32c is stackable with exit entry face 33d of coupling element 33 to permit light signal 35 transfer thereto without substantial degradation thereof. The coupling element 32 is described as a passive element as the light signal 35 is not interrupted by a member embedded in element 32.

Located below optical element 32 is a third optical element 33 having a top exit/entry face 33d and a cylindrical exit/entry face 33a. A mirror 33b is embedded in optical coupling element 33 to deflect the light signal from an axial direction to a radial direction.

The optical coupler 30 comprises a set of cylindrical shaped optical coupling elements that allows each of element 31, 32, and 33 to be rotated to different angular positions so the light can be directed in the proper direction. As shown in FIG. 2, the output light beam off of the embedded mirror or reflecting plate 33b is directed in the same direction as the input beam impinging on embedded mirror or reflecting plate 31b. Thus, with this configuration light from one set of optical fibers oriented in the x direction can be sent to another optical fiber in a different layer that is also oriented in the x direction. However, if one wants to direct the light signal in a different direction one can rotate optical element 33 to direct the light signal 35 in a different direction.

Figure 3:
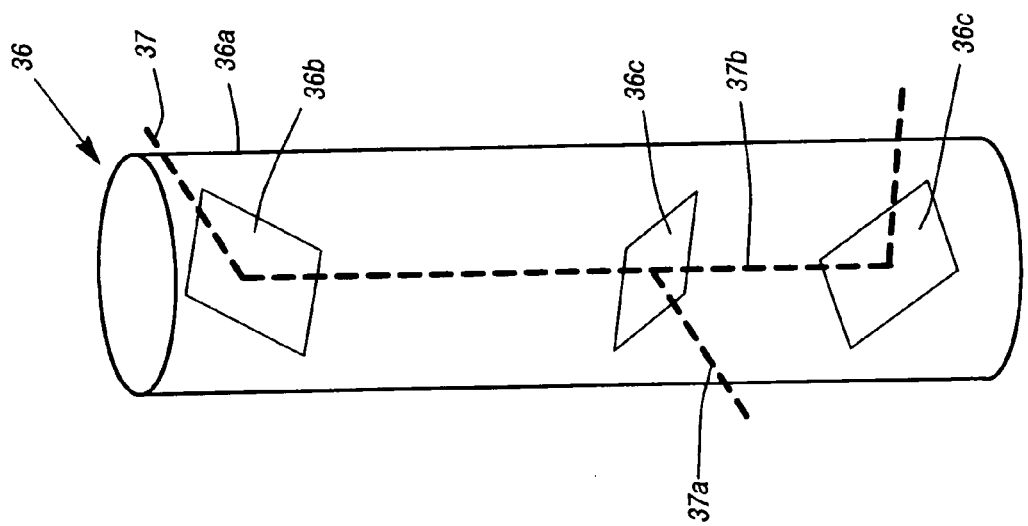
FIG. 3 is a perspective view of a transparent optical coupling element that contains at least two different light directing members embedded therein.

Another optical coupling element 36 is shown in FIG. 3. Optical coupling element 36 comprises a single cylindrical optical coupling element having a cylindrical exit/entry face 36a and a set of three embedded light directing members suspended at different levels in the optical element 36. Optical coupling element 36 includes a first light deflecting mirror 36b, a second beam splitting plate 36c and a second light deflecting mirror 36c. In operation of the optical coupling element 36 a light signal represented by dashed line 37 enters through exit/entry face 36a and is deflected axially downward until the light signal 37 impinges on light beam splitter 36c. The light beam 37 then splits into a first light signal 37a which is directed radially outward of optical coupling element 36 and a second light signal 37b that passes axially downward into mirror 36c and is eventually deflected radially outward though exit/entry face 36a. Thus an optical coupling element of the present invention can contain two or more embedded optical deflecting members therein.

The embodiment of FIGS. 4a, 4b, 4c and 4d illustrate different optical interconnection devices using various combinations of three different optical coupling elements. Each optical element is the same thickness as the interconnect layer so that the number of elements in each passageway is equivalent to the number of layers. The optical interconnection devices illustrated in FIGS. 4a, 4b, 4c and 4d are comprised of optical coupling elements with three different types of embedded light directing members. The first type is an embedded mirror or light reflecting device that deflects the signal at a 90 degree angle. This optical element is referred to as a "90 degree turn" element The second type is an optical coupling element without an embedded member that allows the light to pass through without being affected. This optical element is referred to as a "pass through element" . The third type is an optical coupling element containing an embedded beam splitter and combiner and is referred to as a "splitter/combiner" optical element. This type of element can separate a light signal into two light signals or alternately combines two light signals into one light signal.

Figure 4:
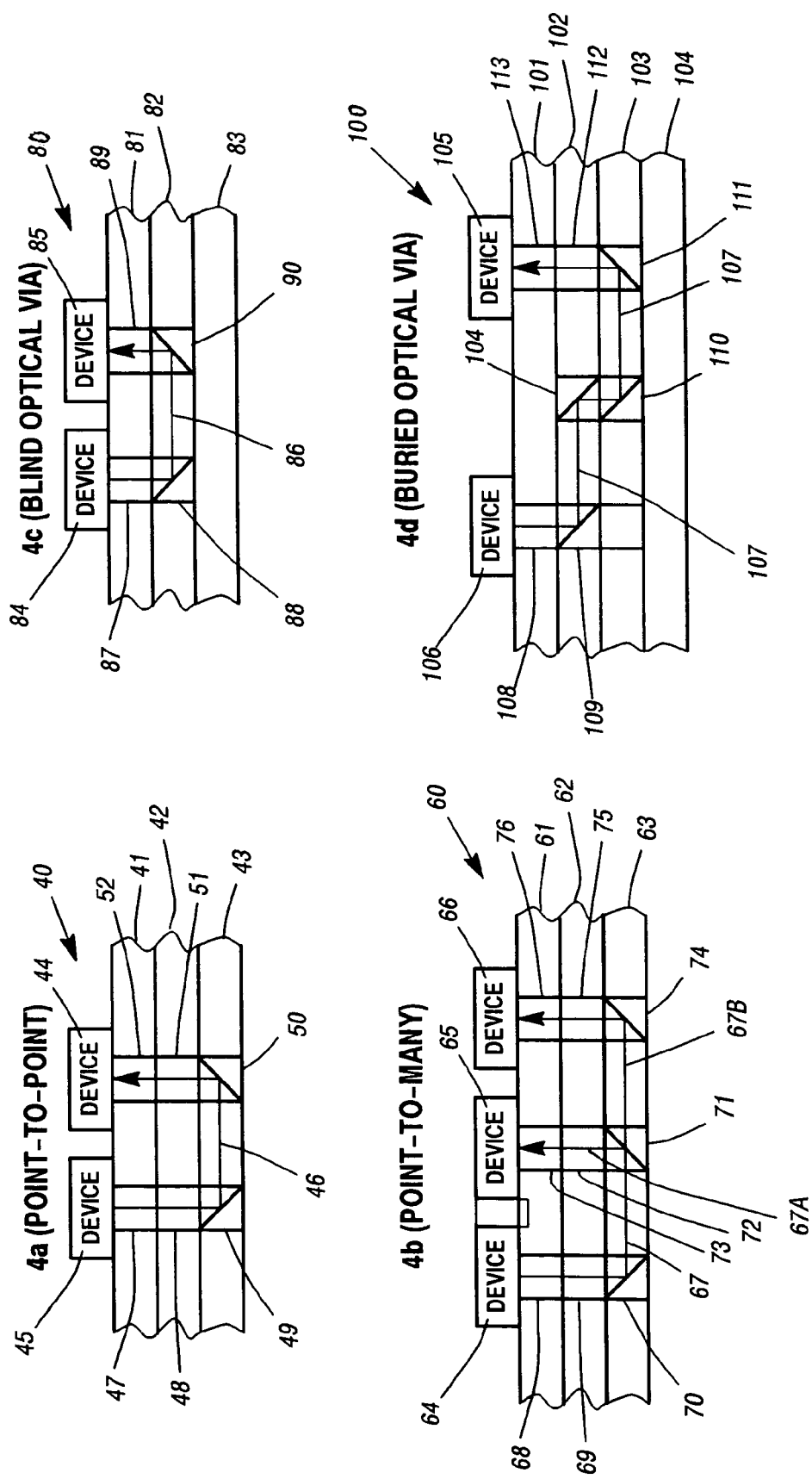
FIG. 4a is a cross-sectional view of a point-to-point optical interconnection.
FIG. 4b is a cross-sectional view of a point-to-many optical interconnection.
FIG. 4c is a cross-sectional view of a blind optical via.
FIG. 4d is a cross-sectional view of a buried optical via.

FIG. 4a shows a "point-to-point" optical interconnection system 40. The system 40 includes a first layer 41, a second layer 42 and a third layer 43 which are stacked on one another. A first optical receiving device 44 is located in one position on top of layer 41 and a second optical transmitting device 45 is also located on top of layer 41. A light signal, which is represented by solid line 46, is shown extending from device 45 to device 46 thorough a set of optical coupling elements located in layers 41, 42 and 43. In the "point-to-point" arrangement the optical interconnections devices comprises passive "pass through" optical coupling elements 47 and 48 that allow light signal 46 to pass through without affecting the light signal. After the light signal 46 passes though optical coupling element 48 it enters a "90 degree turn" element 49 that directs the light signal 46 to a second lateral positioned "90 degree turn" element 50. The light signal 46 is then directed through "pass through" optical coupling elements 51 and 52 which direct the light signal into device 44.

FIG. 4b shows a "point-to-many" optical intersection system 60 containing three optical interconnection devices. This system contains a first layer 61, a second layer 62 and a third layer 63 with a first optical device 64, a second optical device 65 and a third optical device 66 all positioned on top of layer 61. In the system illustrated in FIG. 4b, a light signal 67 from optical device 64 is split into a first light signal 67a that is directed into optical device 65 and a second light signal 67b that is directed into optical device 66. The first optical interconnection device comprises two "pass through" elements 68 and 69 and a "90 degree turn" element 70 that directs the light signal into a "splitter/combiner" 71 which in turn directs light signal 67a axially upward through "pass through" elements 73 and 72 and into optical device 65. A portion of light beam 67, which emerges as light beam 67b, is directed into "90 degree turn" element 74 which directs the light signal 67b through "pass through" elements 75 and 76 and into optical device 66.

FIG. 4c shows a "blind optical via" system 80. System 80 includes a first layer 81, a second layer 82 and a third layer 83 with an optical device 84 and an optical device 85 located on top of layer 81. A light signal 86 is shown traveling from optical device 84 to optical device 85 without entering the third layer 83. In this arrangement, the optical coupling element 87 comprises a "pass through" element and the second optical element 88 comprises a "90 degree turn" element which directs the light signal 86 into a second "90 degree turn" element 90 and therefrom to a "pass through" element 89 that directs the light signal 86 into the optical device 85. In the "blind optical via" system one can pass an optical signal through less than all of the layers of stacked circuit boards.

FIG. 4d shows a "buried optical via" system 100. System 100 includes a first layer 101, a second layer 102, a third layer 103 and a fourth layer 104. Located on top of layer 101 is a first optical device 106 and a second optical device 105. In this system, a light signal 107 is transmitted from device 106 to device 105. A first "pass through" element 108 directs a light signal to a "90 degree turn" element 104 in layer 102. The light signal 107 is then directed to a "90 degree turn" element 104 in layer 102 and then axially downward to a second "90 degree turn" element 110 in layer 103. As can be viewed in the illustrations, each of the "90 degree turn" elements 109 and 110 have a layer adjacent thereto where there is no optical coupling element. The light single 107 is emitted from element 110 and enters "90 degree turn" element 111 and is directed axially upward through "pass through" elements 112 and 113 into the optical device 105.

The above arrangements of optical coupling elements are intended to illustrate how one can stack the various optical coupling elements to provide for different optical paths through stacked layers.

An optical routing or interconnection device in accordance with the invention may consist of multiple stacked coupling elements, as shown in FIG. 2 or single multifunction coupling elements as shown in FIG. 3. The illustrated configurations and the elements described herein are examples of the variety of optical light beam controlling applications that can be implemented within the scope of the present invention through combinations of various optical elements. Although each of the coupling elements are shown as having a cylindrical shape other uniform or non-uniform geometric shapes with multiple sides could also be used.

While the present invention is particularly useful with multi-layer substrates the invention is also useable with a single substrate when a light signal needs to be transferred from a first location within the substrate to a second location within the substrate.

What is claimed is:

1. An optical coupling element comprising:
    a translucent body configured to be received within a hole including an optical entry/exit face and at least one optical entry/exit stacking face, said translucent body having a flat top surface, a flat end surface, and a cylindrical shaped body for rotationally aligning the translucent body at a desired angular position; and
    a light directing member secured within the translucent body to direct a light signal between the optical entry/exit face and the at least one optical entry/exit stacking face.

2. The optical coupling element of claim 1 wherein the light directing member comprises a mirror fixedly embedded in the optical element to deflect the light signal therein.

3. The optical coupling element of claim 1 wherein the light directing member comprises a light beam splitter/combiner fixedly embedded in said optical element to direct a light beam in at least two different directions.

4. The optical coupling element of claim 1 wherein the light directing member comprises a light transparent material that directs the light signal from the optical entry/exit face to the further optical entry/exit face without deflecting the light signal.

5. The optical coupling element of claim 1 wherein the optical coupling element includes at least two light directing members therein.

6. The optical coupling element of claim 5 wherein the two light directing members are located in optical alignment with each other so that a light signal received by one of the two light directing members is directed into the second of the two light directing members.

7. The optical coupling element of claim 5 wherein the optical coupling element includes at least three light directing members therein.

8. An optical device wherein a plurality of three optical coupling elements are combined in a stack such that when light leaves one of said plurality of optical coupling elements it enters another of said plurality of optical coupling elements with said optical plurality of coupling elements comprise:
   at least one of said plurality of optical coupling elements is a transparent element having a light-reflecting element that changes the direction of light that enters the transparent element, said transparent element having flat top surface, a flat end surface, and a cylindrical shape body for rotationally aligning the optical coupling elements at a desired angular position; and
   at least one of said plurality of optical path elements is a transparent element that separates light into two light paths or alternately combines two light paths into one light path.

9. A multi-layer device comprising:
   a first layer having an optical member therein;
   a second layer having a further optical member therein;
   a via located in said first layer and said second layer;
   an optical coupling element located in said via, said optical coupling element having a flat top surface, a flat end surface, and a solid cylindrical shape body for rotationally aligning the optical coupling elements at a desired angular position, said optical coupling element including a first light directing member therein for receiving a light signal from said first layer.

10. The multi-layer device of claim 9 wherein the optical coupling element includes a second light directing member for directing the light signal into said second layer.

11. The multi-layer device of claim 9 including at least two separate optical coupling elements located in a stacked end to end relationship to transmit a light signal from one layer to a second layer.

12. The multi-layer device of claim 9 including a third layer with an optical coupling element located in each of the layers of multi-layered device.

13. The multi-layer device of claim 9 wherein the via extends through said first layer and said second layer.

14. The multi-layer device of claim 9 including a third layer, said third layer having no via therein.

15. The multi-layer device of claim 9 wherein the vias have a sidewall with the dimensions of the sidewall such that an optical coupling element can be frictionally retained therein.

16. The A method of forming a light conducting path between at least two substrates comprising:
   stacking a first optical substrate on a second optical substrate;
   forming a via in the first optical substrate and the second optical substrate;
   extending a cylindrical shaped optical coupling element having a flat top surface and a flat end surface into the via to permit a light signal to be transferred between adjacent substrates through the optical coupling element.

17. The method of claim 16 including the step of placing at least two optical coupling elements in an end to end position in the via.

18. The method of claim 16 including the step of embedding a light directing member in the optical coupling element.

19. The method of claim 16 including the step of firming the via through the optical substrates by drilling a hole therein.

20. The method of claim 16 including the step of embedding at least two light directing members in the optical coupling.

21. The method of claim 16 including arranging the optical coupling elements in a point-to-point system.

22. The method of claim 16 including arranging the optical coupling elements in a point-to-may system.

23. The method of claim 16 including arranging the optical coupling elements in a blind optical via.

24. The method of claim 16 including arranging the optical coupling elements in a buried optical via.

25. A substrate comprising:
   a first optical member located at a first level in said substrate;
   a second optical member located at a second level in said substrate; and
   an optical interconnection device comprising two cylindrical shaped optical coupling elements each having a flat top surface and a flat end surface with the optical coupling members stacked in an end-to-end condition and with at least one of said optical coupling elements having an entry/exit face positioned at the first level in the substrate and at least one of said optical coupling elements having an entry/exit face positioned at the second level of the substrate to permit a light signal transfer from the first level in the substrate to the second level in the substrate or vice versa.

26. The substrate of claim 25 including a via in said substrate with said optical interconnection device retained therein.

27. An optical coupling element comprising:
   a first optical member located at a first level;
   a second optical member located at a second level; and
   a cylindrical shaped translucent body for rotationally aligning the optical coupling elements at a desired angular position, said translucent body having a flat top surface, a flat end surface and an entry/exit face positioned at the first level and an entry/exit face positioned at the second level to permit a light signal transfer from the first level to the second level or vice versa.

28. An optical coupling element comprising:
   a solid cylindrical shaped translucent body having a flat top surface and a flat end surface;
   a first entry/exit face on said body;
   a second entry/exit face on said body; and
   means within said translucent body for directing a light signal from said first entry/exit face to said second entry/exit face or vice versa.

* * * * *